Oct. 31, 1939.    R. N. JANEWAY    2,177,830
BALANCING APPARATUS AND METHOD
Filed Jan. 2, 1937    3 Sheets-Sheet 1
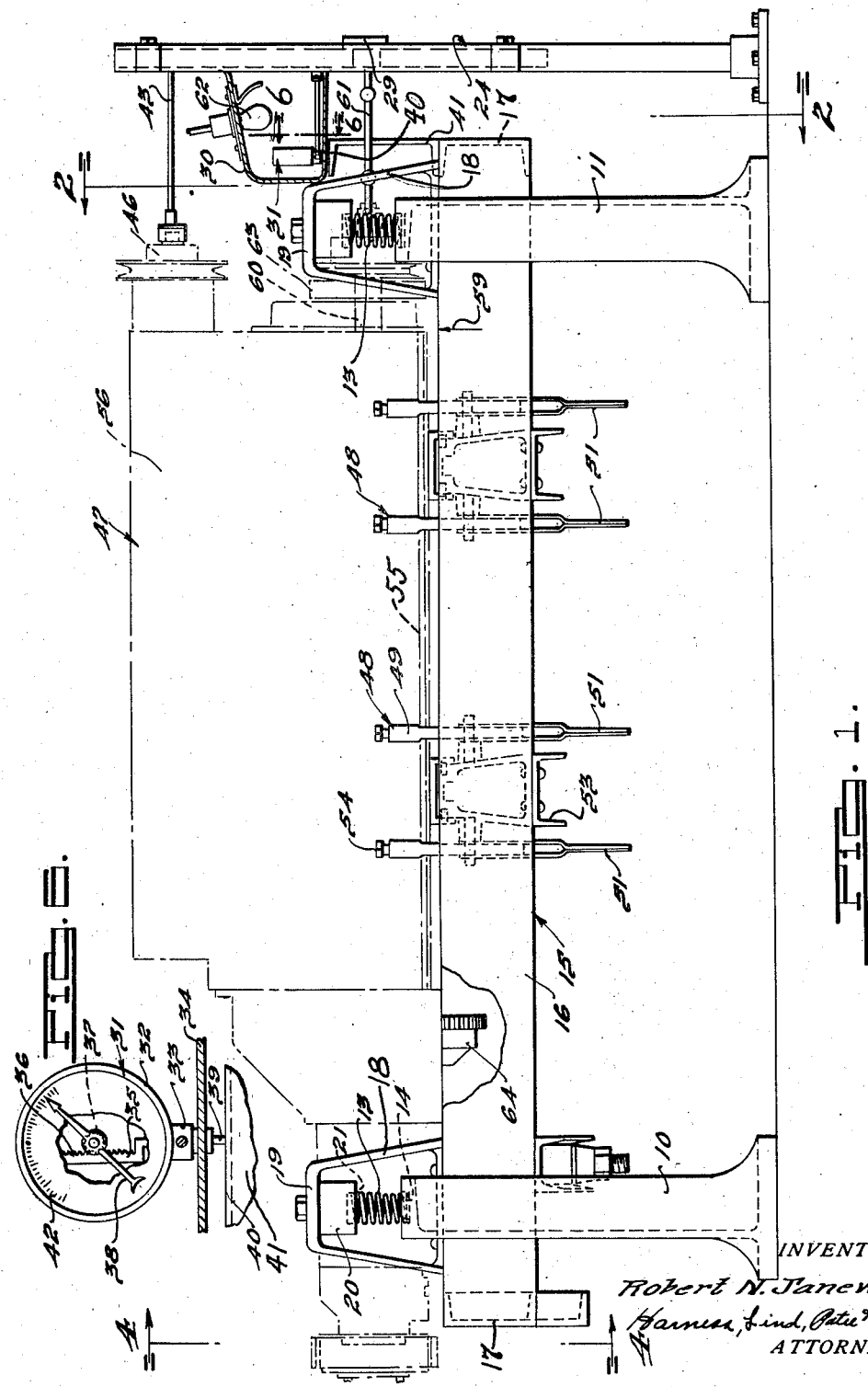
INVENTOR
Robert N. Janeway.
Harness, Lind, Patee & Harris
ATTORNEYS.

Oct. 31, 1939.  R. N. JANEWAY  2,177,830
BALANCING APPARATUS AND METHOD
Filed Jan. 2, 1937   3 Sheets-Sheet 2
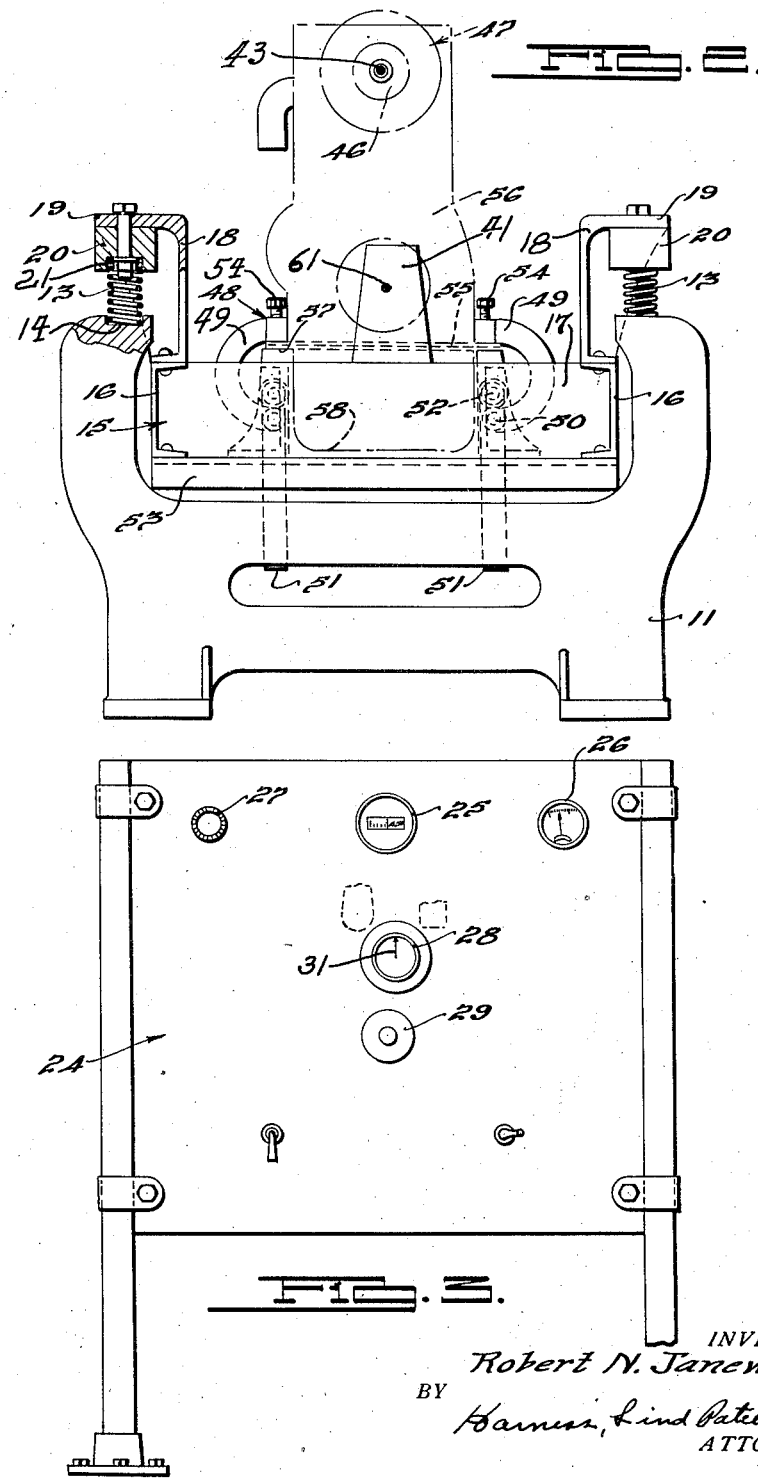
INVENTOR
Robert N. Janeway.
BY
ATTORNEYS.

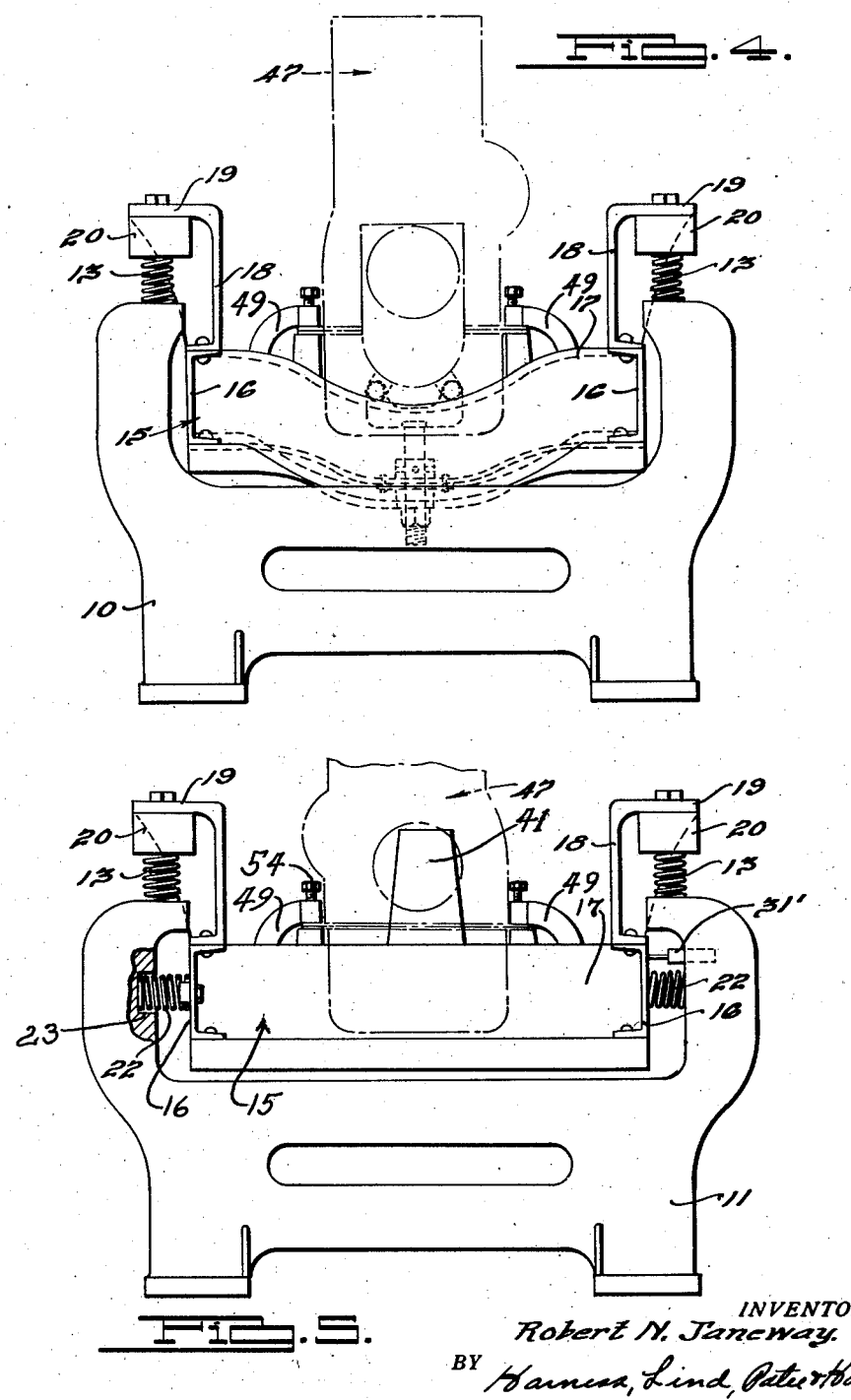

Patented Oct. 31, 1939

2,177,830

UNITED STATES PATENT OFFICE 2,177,830

BALANCING APPARATUS AND METHOD

Robert N. Janeway, Detroit, Mich., assignor to Chrysler Corporation, Highland Park, Mich., a corporation of Delaware Application January 2, 1937, Serial No. 118,763

7 Claims. (Cl. 73—51)

This invention relates to balancing apparatus and method.

More particularly the invention pertains to an improved method and apparatus of this character by which can be compensated for the accumulated dynamic and static out-of-balance of substantially all the rotative parts of an internal combustion engine power plant unit which rotate at the same speed and are in fixed angular relation to each other.

One of the main objects of the invention is to provide an apparatus of this character by which can be ascertained both the locations and amounts of the correction required to compensate separately for the accumulated static and dynamic unbalance of the rotative parts of the engine, clutch and transmission portions of a rotary power plant of the type used in vehicles, boats and stationary installations.

Another object of the invention is the provision of an apparatus and method by which a selected rotative part, or group of rotative parts, can be both statically and dynamically balanced and inspected for unbalance while the device in which the part, or parts, under examination are substantially completely assembled, in order to ascertain whether the static and dynamic unbalance of the part under examination is within permissible limits.

A further object of the invention is to so yieldably and resiliently mount an internal combustion engine power plant during balance tests thereof that sustained vibration in one course, or of one mode, will occur only in response to static unbalance of the parts of the system under examination, and sustained vibration in a different course, or mode, will occur only in response to both static and dynamic unbalance therein during rotation of the rotative parts of the engine at respectively different speeds.

A still further object of the invention is to accommodate vibrations of the engine unit under the foregoing influences in predetermined courses, or modes, which are so related that the amplitudes of each, and therefore the corresponding magnitudes of the respective unbalanced exciting forces can be ascertained by measurement of the movement of the same point on an engine unit relative to its stationary supporting structure and with the aid of the same measuring apparatus.

An additional object of the invention is to provide movement indicating means and apparatus of this character which may be calibrated in units of correction required to bring the engine unit into both statically and dynamically balanced state.

A still further object of the invention is to provide a method and apparatus of this kind by which rotative part containing mechanisms can be conveniently inspected to determine whether static and dynamic unbalance exceed permissible values.

An illustrative embodiment of the invention is shown in the accompanying drawings, in which:

Fig. 1 is a side elevational view, partly in section, of my improved balancing apparatus showing an internal combustion engine unit of the type commonly used in vehicles mounted thereon for examination.

Fig. 2 is a transverse sectional view taken on the line 2—2 of Fig. 1.

Fig. 3 is a right end elevational view of the apparatus shown in Fig. 1.

Fig. 4 is a left end elevational view taken on the line 4—4 of Fig. 1.

Fig. 5 is a view similar to Fig. 2, but showing a modified form of the invention.

Fig. 6 is a fragmentary, vertical sectional view taken on line 6—6 of Fig. 1.

In general the balancing apparatus illustrated in the drawings comprises a stationary base portion on which a power plant carriage is so resiliently mounted as to oscillate in sustained frequency about a transverse axis under the combined influences of static and dynamic out-of-balance of selected parts of a power plant mounted thereon. The resiliently mounted power plant unit support is adapted to reciprocate vertically in sustained vibration under the influence of static unbalance. These two definite vibration modes occur at respectively different speeds of rotation of the rotative parts of the power plant as determined by the respective natural vibration frequencies of the resiliently mounted mass in its vertical reciprocation and oscillative course, respectively. The respective critical speeds are ascertained by determining at what speeds the maximum amplitudes of vibration in the foregoing courses occur.

Indicating apparatus, comprising a stroboscope is provided for ascertaining the amplitudes of vertical movements. This apparatus is so located as also to indicate amplitudes of oscillatory movement and it is preferably calibrated to indicate the amount of correction required to compensate for the respective unbalanced forces. The indicating apparatus also serves to ascertain the location at which corrections are required.

The static unbalance can be determined by operating the engine at the critical speed at which static unbalance produces maximum vibration of one mode, and then later corrected for. After this correction, the oscillatory movements occurring while the power plant unit is operated at the other critical speed is due to dynamic unbalance and can be corrected for by imposing a couple on the rotative assemblies and therefore without introducing further static unbalance.

The balancing apparatus illustrated in the drawings comprises spaced vertically upright standards 10 and 11 on the upper extremities of each of which is mounted a pair of helical springs 13 having their lower extremities seated in recesses 14 formed in the upper end portions of the standards 10 and 11. A power plant unit support or carriage, generally designated by the numeral 15, is resiliently and yieldably supported on the helical springs 13. The carriage 15 comprises a pair of side rails 16 which are connected together at their opposite extremities by end cross members 17. The carriage 15 is provided with spaced pairs of upwardly extending brackets 18 which have outwardly projecting flanges 19 disposed above and in registering relationship with the upper ends of the coil springs 13. Block 20, mounted on each outwardly projecting flange 19 of the brackets 18, are provided with recesses 21 for receiving the upper end portions of the springs 13. The power plant unit carriage is yieldably and resiliently supported in suspending relation in the foregoing manner.

The balancing apparatus illustrated in Fig. 5 of the drawings is substantially the same as that shown in Figs. 1 to 4, inclusive, with the exception that there are provided at the respectively opposite ends of the carriage 15 a pair of laterally disposed helical springs 22 seated in recesses 23 formed in the sides of the standards 10 and 11, which bear laterally against the outer side faces of the side rail 16 of the support 15 in order to yieldably and resiliently limit lateral movement of the carriage. These springs 22 can be calibrated to assist in predetermining the respective speeds of the foregoing modes of vibration. They will also serve to enable balancing determinations to be made in a horizontal plane by observations of horizontal reciprocating and oscillating movements. In this case, indicating apparatus 31', identical to the indicating apparatus 31, hereinafter described, is mounted on one of the standards 10 or 11, and so disposed as to be actuated by horizontal movements of the carriage.

Mounted in advance of the right end of the balancing apparatus illustrated in Fig. 1, is an instrument panel, generally designated by the numeral 24 on which is mounted a tachometer 25, a water temperature indicator 26, a throttle control member 27, a vibration amplitude indicator window 28, and a variable timer 29, as illustrated in Fig. 3. The variable timer 29 is the same in construction as those conventionally used in stroboscopes and it includes a pair of electrical contact members which are permitted to close instantaneously once during each rotation of the member under examination, the contact actuating mechanism being variable to selectively change the occurrence of closing of the contacts with respect to the angular position of the rotative member by which it is operated. Mounted on the left side of the instrument panel 24, as viewed in Fig. 1, is a housing 30 in which is disposed a vibration indicator 31, best shown in Fig. 6. The vibration indicator, generally designated by the numeral 31, comprises a casing 32 having a tubular fitting 33 on its lower extremity by which it is mounted on the floor 34 of the housing 30. Slidably mounted in the fitting 33 is a rack 35 having an end portion provided with rack teeth 36 located in the interior of the casing 31. The rack teeth 36 are meshed with the teeth of the pinion 37 which is rigidly fixed to a rotatable indicator 38, as illustrated in Fig. 6. The rack 35 has a downwardly extending external end portion 39 which projects through the tubular fittings 33 and through an aperture in the floor 34 of the housing 30 into registration with a flange 40 of a bracket 41 carried by the resiliently mounted power plant unit carriage 15, as illustrated in Fig. 1. Either vertical reciprocatory movement of the carriage 15 relative to the stationary standards 10 and 11, or oscillatory movement thereof about a transversely extending axis causes vertical movement of the rack 35, the amount of which is indicated on the scale 42 of the vibration indicating device 31.

The tachometer 25 has a rearwardly extending shaft 43 which is adapted to be coupled with the fan pulley shaft 46 of an internal combustion engine power plant unit, generally designated by the numeral 47 in Fig. 1, when the latter is suitably mounted on carriage 15.

Mounted on each side rail 16 are two pairs of toggle clamping devices generally designated by the numeral 48, for securely holding the motor 47 on the carriage 15. Each pair of clamping devices 48 comprises a semi-circular shaped clamping element 49 pivotally mounted at 50 upon a combined toggle and operating lever 51 which is in turn pivotally supported at 52 on a bracket 53 secured to the side rail 16. Provided on the upper extremity of the clamping element 49 is a set screw 54 which is adapted to engage upon a flange 55 formed on the lower extremity of the crank case of the internal combustion engine portion 56 of the power plant unit 47. A flange 57 of the oil pan 58 of the internal combustion engine 56 is disposed adjacent the flange 55 and seated upon the upper extremities of the brackets 53, as illustrated in Fig. 2. The right hand clamping devices 48 may be released by rotating the levers 51 in a counter-clockwise direction, as viewed in Fig. 2, and the clamping devices of the opposite side of the carriage may be released by rotating the levers 51 thereof in a clockwise direction, as viewed in this figure. Opposite rotation of the levers of these respective clamping devices brings the lower end of the set screws 54 into clamping engagement with the flange 55. In mounting a power plant unit on the carriage 15 it is preferable to position the center of mass of the unit substantially mid-way between the two pairs of springs 13. This may be conveniently accomplished by applying a reference mark 59 on one of the side rails 16, as illustrated in Fig. 1, and bringing one extremity of the power plant unit, or a fixed point thereon, into vertical registration with this reference mark during the mounting of the unit on the carriage.

The power plant unit 47 is mounted on the balancing apparatus in such a manner as to bring the front end of the internal combustion engine unit and particularly the forward end of the crank shaft 60 thereof, substantially in horizontal registration with the variable timing device 29 which is operatively connected with the crank shaft 60 by a shaft 61. The variable timing device, comprising an adjustable circuit breaker, of the type conventionally used in stroboscopes, is electrically connected in a circuit (not shown) in which a neon light 62 is also included. The circuit is supplied with current from an external source and each time the contacts of the timing device 29 are closed the circuit is completed and the neon light 62 is illuminated, thereby revealing the instantaneous position of the indicator 38, which in turn indicates the instantaneous amplitude of vibration of the front end portion of the system.

In describing the operation of the balancing apparatus and method, an internal combustion engine power plant unit is used as an example, the parts of the unit which rotate at the same speed as, and in fixed angular relation to, the crankshaft of the unit being under examination for the purpose of illustration. A power plant unit or a part or parts of rotative mechanism to be tested for static and dynamic balance is mounted on the carriage 15 in the foregoing manner and it is operated either under its own power or it may be driven in any suitable manner. The power plant is first operated at the critical speed at which static unbalance of the rotative parts of the system tend to produce only vertical reciprocatory vibration of the power plant unit and carriage on the springs 13, the resiliency of the springs 13 being suitably predetermined to establish and accommodate this mode of vibratory movement of the resiliently suspended mass at such critical operative speed. The springs 13, which have substantially identical characteristics, are located preferably at the elevation of center of mass of the suspended system in order to avoid instability, and they are longitudinally equally spaced from the center of mass.

During operation of the power plant unit under the foregoing conditions, the vertical component of the centrifugal action resulting from the presence of a statically unbalanced mass produces sustained vibratory movement of the system in a vertical course. The amplitude of vertical reciprocatory vibratory movement for any instantaneous angular position of the crankshaft, for example, is indicated by the indicating device 31 which is illuminated by the neon light 62 for a very short period of time while the crankshaft is at a selected angular position as determined by the setting of the variable timing device 29. During examination of a power plant unit, the timing device 29 is adjusted until a reading of amplitude of maximum value is obtained on the indicating device 31. Operation of the power plant unit is then discontinued and the crank shaft is reset, preferably manually, to bring the contact of the timing device 29 into engagement so as to thereby determine in what angular position the crankshaft is disposed when the statically unbalanced mass of the rotative parts of the unit is in that critical position which effects maximum displacement of the suspended system. Since the movement of maximum amplitude occurs after 90° of rotation of the crankshaft beyond this critical position, proper compensation must be made for this phase relationship. If a reading is taken for maximum upward movement of the power plant unit and its carriage while operation of the crankshaft in a clockwise direction, as viewed in Fig. 2, for example, then the unbalanced mass will, in effect, be located 90° after top dead center of the crankshaft while the latter is so positioned as to establish engagement between the contacts of the timing device 29. Correction for such an unbalanced mass may be made by either removing metal from the vibration damper inertia member 63 at a location 90° after the top dead center position of the crankshaft as determined above, or by adding metal thereto at a location 180° from this position. Such corrections may be made in one plane or divided and made in two planes, one being at the location of the damper and the other at the location of the flywheel.

After the rotative parts of the power plant unit have been corrected for static out-of-balance, the unit is then operated at the critical speed for dynamic unbalance. Since the static unbalance has been corrected for and since only static unbalance and dynamic unbalance tend to oscillate the engine about a transverse axis during operation thereof at said last mentioned critical speed, any movement indicated by the indicating device 31 is therefore due to dynamic unbalance. The amplitude of the dynamic unbalance may be determined by reading the indicating device 31 and may be corrected for by applying a couple on the crankshaft corresponding and opposite to the movement required to displace the mass an amplitude equal to that indicated on the indicating device. The angular locations of the weights required to make this dynamic correction may be determined in the same manner as the location for compensating for static unbalance. In this instance at least one of the weights employed to establish the correcting couple is located 90° before top dead center of the crankshaft while the latter is in that angular position which causes the contacts of the timing device to engage after the timing device has been set to illuminate the indicator at the instant of maximum movement of the suspended mass, as determined above. The other weight is located 180° from the first mentioned couple establishing weight. This couple may be applied by placing weights which produce equal and opposite centrifugal forces at angular positions located as previously set forth on the flywheel 64 and vibration damper inertia member 63, respectively.

If desired, the scale 42 of the indicating device 31 may be calibrated in terms of units of weight required for both static and dynamic unbalance, employing two separate scales if necessary. This may be accomplished by mounting a statically and dynamically balanced power plant unit on the carriage 15 and then throwing it out of both static and dynamic balance by progressively increasing amounts and noting on the indicating device the resulting amplitudes of vibrations of the respective modes produced by the known unbalanced characteristics. This may also be accomplished by subjecting the carriage to known static and dynamic unbalance with the aid of a calibrating device driven independently at the critical speeds.

In illustrating one embodiment and operation of the invention, reference has been made mainly to the balancing of a power plant unit of the type conventionally used in motor vehicles. Substantially the same apparatus and method may, however, be employed in balancing any rotative part or group of parts of diverse mechanisms, or any complete machine involving rotative parts.

Although but several specific embodiments of the invention is herein shown and described, it will be understood that various changes in the size, shape and arrangement of parts may be made without departing from the spirit of my invention.

What I claim is:

1. The method of compensating for static and dynamic unbalance of a rotative part which comprises rotatively mounting said part and so resiliently and floatingly supporting said rotatively mounted part that static unbalance thereof produces only one mode of bodily vibration thereof in a predetermined plane at a predetermined rotative speed of said part and a different mode of bodily vibration is excited in said predetermined plane only by dynamic and static unbalance of said part during rotation thereof at a different predetermined speed, measuring the amplitude of bodily vibration of said part while rotating it at said first predetermined speed and while said part is so supported as to accommodate both said modes of bodily vibration thereof to ascertain the correction required to bring said part into static balance with respect to its rotative axis, making said required correction, measuring the amplitude of vibration of said statically balanced part during rotation thereof at said second predetermined speed and while said part is so supported as to accommodate both said modes of bodily vibration thereof to ascertain the correction required to bring said rotative part into dynamic balance with respect to said axis, and making said latter correction.

2. The method of compensating for static and dynamic unbalance of rotative parts of a power plant unit which comprises so resiliently mounting and supporting the entire weight of said power plant that static unbalance of said rotative parts produces only one mode of bodily vibration of said power plant and its support in a predetermined plane at a predetermined operative speed of said power plant and a different mode of bodily vibration of said power plant is excited in said predetermined plane only by dynamic and static unbalance of said parts at a different predetermined operative speed of said power plant, measuring the amplitude of vibration of said first mode while operating said power plant at said first predetermined speed and while said power plant is so supported as to accommodate both said modes of vibration to ascertain the correction required to bring said rotative parts into static balance, making said required correction, measuring the amplitude of vibration of said second mode while operating said power plant at said second predetermined speed and while said power plant is so supported as to accommodate both said modes of vibration to ascertain the correction required to bring said rotative parts into dynamic balance, and making said latter correction.

3. The method of compensating for static and dynamic unbalance of rotative parts of a power plant unit which comprises so resiliently mounting and supporting the entire weight of said power plant that static unbalance of said rotative parts produces only vertical bodily reciprocation of said power plant and its support at a predetermined operative speed of said power plant and oscillation of said power plant about a predetermined axis is excited only by dynamic and static unbalance of said parts at a different predetermined operative speed of said power plant, measuring the amplitude of vertical reciprocatory movement of said power plant while operating the latter at said first predetermined speed to ascertain the correction required to bring said parts into static balance, making said correction, measuring the amplitude of oscillation of said power plant and its support while operating the latter at said second predetermined speed to ascertain the correction required to bring said parts into dynamic balance, and making said last mentioned correction.

4. The method of inspecting a rotative part of an assembled machine for both static and dynamic unbalance which comprises so resiliently mounting said machine that static unbalance of said part produces only one mode of vibration of said machine at a predetermined speed of operation thereof and a different mode of vibration is excited only by dynamic and static unbalance of said part at a different predetermined speed, measuring the amplitude of vibration of said machine while operating the latter at said first mentioned predetermined speed and while said machine is so supported as to accommodate said modes of vibration for comparison with the maximum vibration amplitude corresponding to static unbalance of a permissible order, and measuring the maximum amplitude of vibration of said machine while operating at said second mentioned predetermined speed for comparison with the maximum amplitude of vibration corresponding to the resultant permissible static and dynamic unbalance.

5. Apparatus for balancing rotative mechanism of a machine comprising a base structure, a support for said machine, and means for resiliently, yieldably and floatingly mounting said support on said base structure, said resilient means sustaining the entire weight of said support and mechanism, said means being so constructed and arranged that only static unbalance of said rotative mechanism excites one mode of sustained vibration thereof in a predetermined plane at a predetermined speed of operation of said machine, means for measuring the maximum amplitude of said mode of vibration in said plane and means for ascertaining the angular position of one of the rotative parts of said mechanism at the instant said maximum amplitude of vibration occurs to facilitate locating of and correction for the unbalanced mass by which it is excited.

6. Apparatus for balancing a rotative part of an assembled power plant unit comprising a base structure, a power plant unit support, means for resiliently, yieldably, floatingly mounting said support on said base structure, said resilient means sustaining the entire weight of said support and said power plant, said means being so constructed and arranged that only static unbalance of the rotative part under examination excites one mode of sustained vibration thereof in a predetermined plane at a predetermined speed of operation of said unit and only dynamic unbalance of said part will excite a different mode of sustained vibration thereof in said plane at a different predetermined speed of operation when said rotative part is in static balance, and means for measuring the maximum amplitudes of both of said modes of vibration in said plane respectively and for ascertaining the respective angular positions of one of said rotative parts at the instants said maximum amplitudes of vibration occur to facilitate correction for the unbalanced characteristics of said unit.

7. Apparatus for balancing rotative mechanism of a power plant unit comprising a base structure, a power plant unit support, resilient means interposed between said base structure and each end of said support for accommodating vertical reciprocatory movement thereof and oscillatory movement of said support about a transverse axis, means for so mounting a power plant unit on said support that its center of gravity is disposed substantially in a vertical plane midway between the resilient means of opposite ends of said apparatus, said resilient means being of such deflection rate that static unbalance of said rotative mechanism of said unit excites only vertical reciprocation of said unit and said support in a predetermined plane during operation of said unit at a predetermined speed and oscillatory movement of said support and unit in said plane about said axis is excited only by static and dynamic unbalance of said mechanism while the latter is operated at a different predetermined speed, and means for measuring the respective maximum amplitudes of said oscillatory and reciprocatory movements and for ascertaining the angular positions of a part of said rotative mechanism at the instants said movements of maximum amplitudes occur.

ROBERT. N. JANEWAY.